United States Patent
Anderson et al.

(10) Patent No.: US 7,156,642 B2
(45) Date of Patent: Jan. 2, 2007

(54) DOUGH ROLLING APPARATUS AND METHOD

(75) Inventors: Marlin L. Anderson, Irving, TX (US); David Lawrence Barry, Highland Village, TX (US); David Brian Emerson, Coppell, TX (US); William C. Flannigan, San Antonio, TX (US); John D. Kiel, Allen, TX (US); Geoffrey T. Ley, Dallas, TX (US); Thomas E. Lyons, Rio Medina, TX (US); Richard James Ruegg, Coppell, TX (US)

(73) Assignee: Frito-Lay North America, Inc., Plano, TX (US)

( * ) Notice: Subject to any disclaimer, the term of this patent is extended or adjusted under 35 U.S.C. 154(b) by 302 days.

(21) Appl. No.: 10/946,831

(22) Filed: Sep. 22, 2004

(65) Prior Publication Data
US 2006/0062879 A1    Mar. 23, 2006

(51) Int. Cl.
*A21C 3/06* (2006.01)

(52) U.S. Cl. .................. 425/297; 425/305.1; 425/320; 425/335; 425/364 R (58) Field of Classification Search ................ 425/297, 425/305.1, 320, 335, 364 R, 391; 99/450.1
See application file for complete search history.

(56) References Cited

U.S. PATENT DOCUMENTS

| | | | | |
|---|---|---|---|---|
| RE17,711 E | * | 6/1930 | Scruggs | ....................... 425/320 |
| 2,450,033 A | * | 9/1948 | Cohen | ....................... 99/450.1 |
| 2,677,334 A | * | 5/1954 | Hansen | .................... 425/364 R |
| 3,116,703 A | * | 1/1964 | Enoch et al. | ................ 425/320 |
| 4,318,678 A | * | 3/1982 | Hayashi et al. | ............. 425/391 |
| 4,389,176 A |   | 6/1983 | Nenci | |
| 4,555,226 A | * | 11/1985 | Benier | ....................... 425/320 |
| 4,666,391 A |   | 5/1987 | Watt et al. | |
| 4,905,583 A |   | 3/1990 | Hayashi | |
| 4,994,293 A |   | 2/1991 | Hayashi | |
| 5,078,585 A | * | 1/1992 | Morikawa et al. | .......... 425/391 |
| 5,281,120 A | * | 1/1994 | Morikawa et al. | ......... 99/450.2 |
| 6,079,970 A |   | 6/2000 | Ueno | |
| 6,171,628 B1 |   | 1/2001 | Ueno | |
| 6,207,212 B1 | * | 3/2001 | Nanahara et al. | ........... 425/320 |
| 6,393,974 B1 |   | 5/2002 | Rodriguez et al. | |
| 6,838,105 B1 | * | 1/2005 | Finkowski et al. | ......... 425/320 |

FOREIGN PATENT DOCUMENTS

MX            215586        10/1999

* cited by examiner

*Primary Examiner*—James P. Mackey
(74) *Attorney, Agent, or Firm*—Carstens & Cahoon, LLP; Colin P. Cahoon; William S. Wang (57) ABSTRACT

An improved dough-rolling apparatus and method for rolling sheeted dough. The proposed invention comprises a dough-rolling apparatus having a dough sheeter, a sheeting conveyor having a ramped section, a roll-initiating curtain positioned above the ramped section, and a roll-completing curtain positioned above the conveyor and downstream from the roll-initiating conveyor. Sheeted and cut dough pieces are deposited onto a steel mesh, partially-ramped sheeter belt, where two wire-mesh rolling curtains are draped onto the sheeter belt to induce rolling of the dough pieces.

15 Claims, 8 Drawing Sheets

DOUGH ROLLING APPARATUS AND METHOD

BACKGROUND

1. Technical Field

The present invention relates to an apparatus and method for forming tubes of dough. Specifically, this invention relates to a dough-rolling apparatus having a dough sheeter, a receiving conveyor having a ramped section, a roll-initiating curtain, and a roll-completing curtain.

2. Description of Related Art

Rolled products are found in many different food industries such as croissants, wafer sticks, and frozen/stuffed taquitos. Many prior art processes have been developed to address the complexities of rolling each of these products. For example, the croissant industry generally utilizes a relative speed differential between two belts. The croissant industry uses relatively thick dough with a high degree of tackiness, which makes it fairly easy to manipulate. In contrast, the wafer stick industry typically uses a batter that is drum dried, wound around a mandrel at a 45-degree angle, and then cut into pieces.

In the snack food industry, however, the dough used typically comprises one or more starches and/or flour, which dough is then thinly sheeted, cut into pieces, and then toasted, fried and/or baked. Typical dough types include, but are not limited to, the following: potato, rice, corn-based doughs, and wheat-based doughs. It is particularly desirable to produce a cylindrically shaped snack piece made of thinly sheeted dough that is toasted, fried, and seasoned. The dough used in such snack products, unlike the dough used in other food industries, is generally very thin, fragile, and difficult to manipulate. This makes typical rolling technology unacceptable for such an application. Additionally, the processing rates required in the snack food industry are very high relative to other industries, making dough-rolling even more difficult.

Although hanging curtains have been used in the prior art to roll dough sheets, existing prior art devices suffer from less-complete rolling of product when dough sheets fail to separate from the conveying surface upon meeting such hanging curtains. Furthermore, prior art dough-rolling devices lack the ability to produce rolled products from thin dough pieces reliably, efficiently, and at high volume and high speeed. For example, while the Rodriguez patent (U.S. Pat. No. 6,393,974) discloses the use of hanging curtains over flat conveyors, there has never been a ramped dough-rolling apparatus to enable more reliable, complete rolling. U.S. Pat. No. 6,393,974 B1 (the "'974 Patent"), titled "Apparatus for Production of a Small Tortilla," is directed towards an apparatus for rolling raw tortillas into the shape of a taco and contains one independent claim (claim 1). The '974 Patent relates to a dough-rolling apparatus having a "pre-rolling up mesh" and a "final rolling up mesh," and it repeatedly emphasizes the need for such meshes to be positioned over an "acceleration conveyor" that operates faster than the preceding "exit conveyor." For example, the '974 Patent at column 4, lines 53–55, states that "[n]ext to the exit conveyor 106 is an acceleration conveyor 108 with an equal transversal section that advances at a greater speed than the exit conveyor 106." At column 5, lines 6–14, the '974 Patent continues, "pre-rolling up meshes 119 are placed with a small surface of contact and dragging with the mesh of acceleration conveyor 108 . . . The final rolling up meshes 120 show a greater surface of contact and dragging with the acceleration conveyor 108 . . ." Operating and maintaining an acceleration conveyor in addition to a sheeter exit conveyor is undesirable, as it introduces another potential product transfer point where problems may occur. Adding a second conveyor of a different operating speed to the system can also increase the complexity of the control process and add capital expense. The '974 patent also states in column 1, lines 58–63: "adjustment of the speed of the exit conveyor together with modifications to the rollers is required. The new structure of the laminator eliminates the versatility of such conveyor and renders the laminator incapable of being used afterwards as other types of products requires speeds by which the laminator was redesigned."

Another prior art dough-rolling apparatus is disclosed in U.S. Pat. No. 6,171,628 B1 (the "'628 Patent"), which issued to Ueno on Jan. 9, 2001 and is titled "Method for Rolling Up a Sheet of Dough." Although the '628 Patent discloses the use of hanging curtains to induce sheets of dough to roll, the '628 Patent actually teaches away from the use of hanging curtains and is instead directed towards a roll-up roller for rolling sheets of dough. See '628 Patent at column 1, lines 38–40; '628 Patent FIGS. 7a, 7b and 7c (illustrating common jamming problems associated with dough-rolling curtains).

U.S. Pat. No. 6,079,970 (the "'970 Patent") issued to Ueno on Jun. 27, 2000, and is titled "Apparatus for Rolling Up a Sheet of Dough." Like the later-issued '628 Patent, the '970 Patent actually teaches away from and discourages the use of hanging curtains and is instead directed towards a roll-up roller for rolling sheets of dough. See '970 Patent at column 1, lines 35–37; '970 Patent FIGS. 7a, 7b and 7c.

U.S. Pat. No. 4,994,293 (the "'293 Patent") and U.S. Pat. No. 4,905,583 (the "'583 Patent") were granted to Hayashi on Feb. 19, 1991 and Mar. 6, 1990 and are titled "Method for Rolling Croissant Dough Pieces" and "Apparatus and Method for Rolling Croissant Dough Pieces," respectively. The '583 Patent and the '293 Patent, which is a divisional application of the '583 Patent, are both directed towards an apparatus and method for rolling triangular dough pieces into croissant shapes using a flexible hanging screen. The '293 and '583 Patents emphasize that the dough pieces are to be stretched and transferred to a rolling apparatus without significantly decreasing the adhesiveness of the dough pieces. Whereas prior art methods for rolling dough pieces into croissant shapes employed the use of flour to make dough pieces less adhesive and more easily managed, the '293 and the '583 Patents teach that such loss of adhesiveness is disadvantageous for producing tightly-wound croissants. The '293 and '583 Patents, however, do not provide a means for ensuring that the dough-rolling curtain effectively initiates a rolling action, nor do they offer solutions to the problems of effecting more complete rolling and preventing product jamming along the flat surface of the dough-rolling conveyor. While it is possible to use a single dough-rolling curtain to roll a piece of sheeted dough, such a device tends to have lower rolling efficiency and lower throughput than is desirable.

U.S. Pat. No. 4,666,391 (the "'391 Patent") was granted to Watt et al. on May 19, 1987 and is titled "Apparatus for Rolling Up a Pastry Layer and a Separator Sheet." The '391 Patent is directed towards an apparatus for forming rolled pastries having a film interposed between adjacent rolled layers to inhibit the layers from sticking to each other. While the '391 Patent discloses the use of a single drag-inducing member as a roll-up device over a flat conveying surface, the '391 Patent does not address the problem of jamming, which occurs when sheeted dough fails to separate from the conveying surface upon meeting the drag-inducing member.

U.S. Pat. No. 4,389,176 (the "'176" Patent) was granted to Nenci on Jun. 21, 1983 and is titled "Machine for the Production of Tubular Casings of Alimentary Dough." The '176 Patent relates to a dough-rolling device in which pieces of dough are rolled around support cores to form cannoli tubes. While the '176 Patent discloses the use of a metal mesh screen as a dough-rolling device, the metal mesh of the '176 Patent is supported and held taught between two rollers. See '176 Patent at column 6, lines 26–30. A taught, flat mesh screen would not be appropriate for thin and fragile doughs such as thinly-sheeted corn masa, because such a flat screen may unduly concentrate rolling forces and pressure at the minimal contact area between the flat screen and rolled masa products. This would likely result in destruction of the fragile masa product. Thus, a flexible chain or mesh curtain is critical for rolling fragile dough pre-forms.

Consequently, a need exists for a dough-rolling apparatus and method that separates the leading edge of sheeted dough from the conveying surface before rolling for improved rolling consistency and to allow rapid changeovers to form traditional, flat products such as tortilla chips. In particular, such a dough-rolling apparatus should comprise a single conveyor having a ramped section leading to a roll-initiating mesh curtain and followed thereafter by a roll-completing mesh curtain. The ramped section of such an apparatus should provide: 1) improved rolling efficiency and completeness of rolling; 2) greater throughput and faster speeds; and 3) reliable, consistent rolling performance even when other pieces of equipment within the rolling system are not operating within the desired conditions, or when wearable parts begin to wear or undesirably collect product. The ramped section of such an apparatus should also have a launching-side angle and a declining-side angle that is optimized for the speed of the conveyor and offers an appropriate balance between the curtain rolling forces and the friction applied by the conveyor. Otherwise, too little ramp angle may result in incomplete or lesser degrees of rolling, while too much ramp angle may not offer enough conveyor surface friction and thus cause product to fall back and possibly jam the apparatus. An improved dough-rolling apparatus should also employ replaceable wear strips and a lift-arm assembly for quickly repairing or replacing hanging curtains, or for changing over to standard processes such as, but not limited to, tortilla chip processing. A lift-arm assembly enables quick changeovers of replaceable, wearing parts with less downtime. An improved dough-rolling apparatus should further include a stiff plate or other stiff supporting members for the conveying surface directly under the rolling curtains to ensure a flat surface across the width of the conveying surface. Such a dough-rolling apparatus should also include a sheeter and cutter, upstream from the rolling stage, having an improved dough-cutting pattern for cutting sheeted dough into pieces (pre-forms) that have shapes and orientations advantageous for rolling.

SUMMARY OF THE INVENTION

The proposed invention comprises a dough-rolling apparatus having a dough sheeter, a receiving conveyor having a ramped section, a roll-initiating curtain positioned above the ramped section just downstream of the peak of the ramp, and a roll-completing curtain positioned downstream from the roll-initiating curtain.

A ramped dough-rolling conveyor solves the problem of pre-forms (sheeted and cut pieces of dough) jamming and failing to roll as they pass under the first curtain or set of curtains. In the detailed description, the following elements will be described in more detail: a single, ramped conveyor; two sets of hanging rolling curtains; curtain attachment bars; vertically adjustable supports; a lifting arm assembly; nylon wear strips; and improvements to preform shape/cutting patterns.

The invention described herein is used to roll dough comprising of raw or partially-cooked starches into a cylindrical shape with a hollow center. Typical doughs to be rolled with this process include but are not limited to: potato, rice, corn-based doughs, and wheat-based doughs. Sheeted and cut dough pieces are deposited onto a steel mesh sheeter belt (conveyor), where two wire mesh rolling curtains are draped onto the sheeter belt to induce rolling of the dough pieces. Adequate space between dough pieces is created by a combination of cutter design and adjustment of relative speeds between the sheeting rolls and the sheeter belt. Effective rolling of the precuts/pre-forms (dough pieces) is obtained by using a proper combination of wire mesh gauge, mesh loops per linear foot of rolling curtain, the length, width, and height of rolling curtain(s) relative to the sheeter belt, and the product thickness, weight, and moisture content. The launch-side angle and descending-side angle of the ramped section, along with the positioning of the hanging curtains above the ramp, also affect the rolling behavior of the dough pieces. The ramp enables the leading edges of the dough pieces to separate from the sheeting conveyor, the first rolling curtain catches the leading edges and initiates rolling, and the second rolling curtain ensures completion of rolling.

Additional features and benefits of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

While the invention is described below with respect to a preferred embodiment, other embodiments are possible. The concepts disclosed herein apply to other systems for producing sheeted products.

Figure 1:
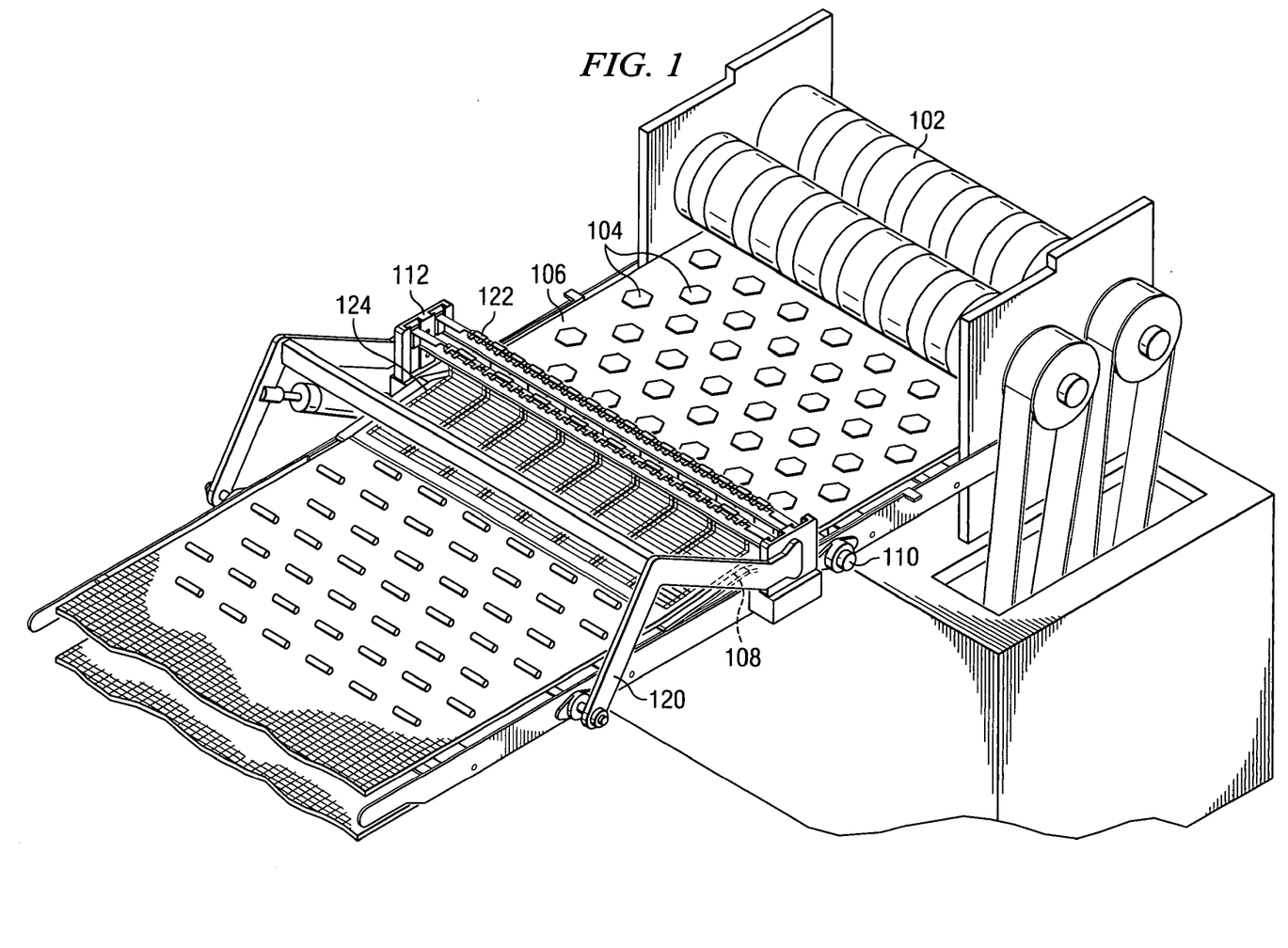
FIG. 1 is a perspective view of a dough-rolling apparatus in accordance with one embodiment of the present invention.
Figure 2:
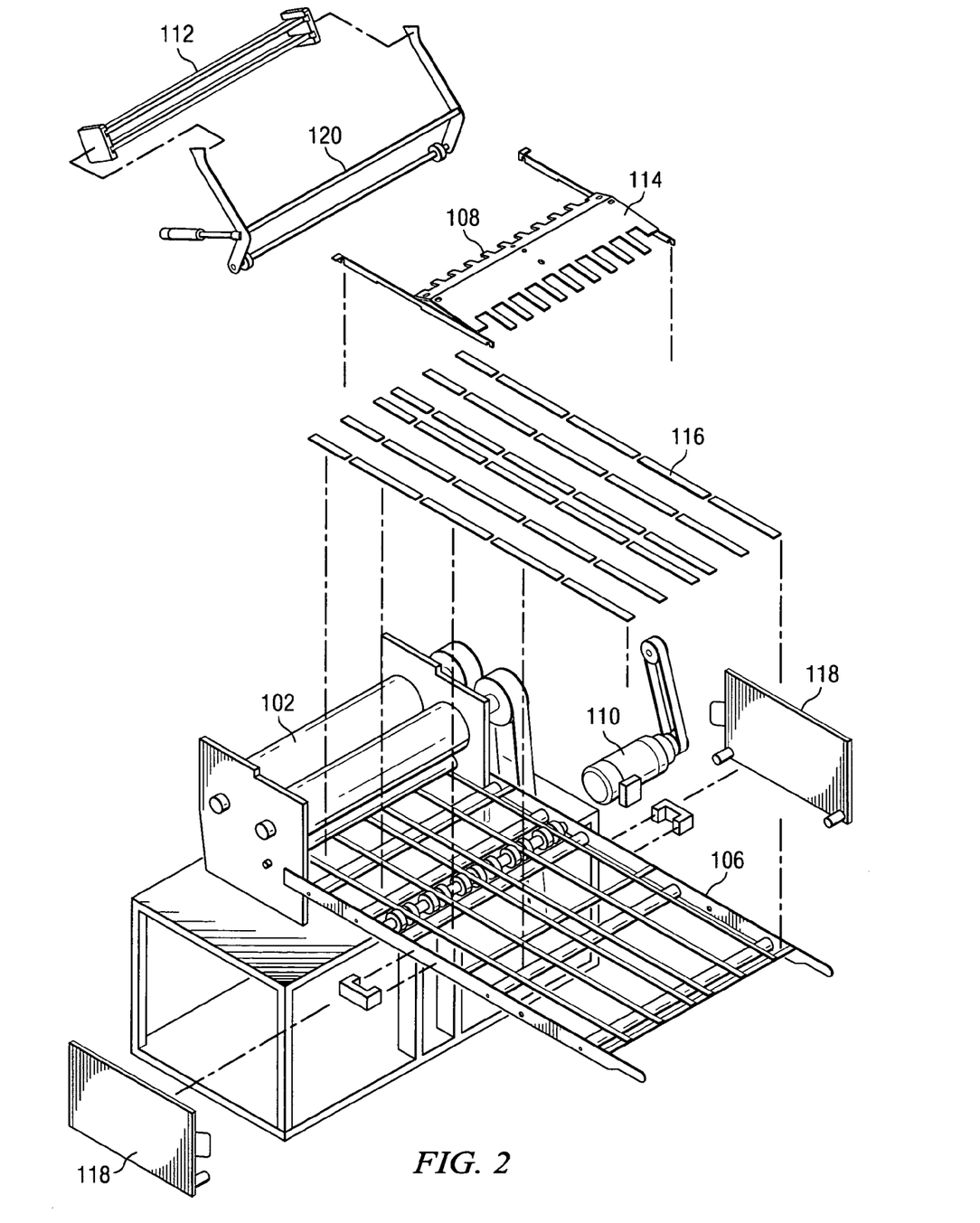
FIG. 2 is a perspective view of several of the main elements of the apparatus shown in FIG. 1.

System Overview—FIG. 1 is a perspective view of a dough-rolling apparatus in accordance with one embodiment of the present invention, and FIG. 2 is a perspective view of several of the main elements of such an apparatus. The dough-rolling apparatus is capable of rolling most varieties of doughs including but not limited to: potato, rice, corn-based doughs, and wheat-based doughs. At the front end of the apparatus is a sheeting device 102, which appears on the far right side of FIG. 1 and the far left side in FIG. 2. In a preferred embodiment, the sheeter 102 comprises an industrial combination sheeter-and-cutter such as, but not limited to, a Casa Herrara 39-inch, eight-row corn masa sheeter. A separate dough pre-form cutter, however, can instead be positioned downstream from a sheeting device, if desired. In a preferred embodiment, the system is designed to roll a flat pre-form 104 into a hollow cylinder approximately two inches long and ⅜ of an inch in diameter as shown in FIG. 1. Note, however, that other embodiments and product sizes are possible within the scope of this invention.

Sheeted and cut pieces of dough ("pre-forms") 104 are transported away from the sheeting and cutting stage upon a receiving sheeter conveyor 106. This receiving sheeter conveyor 106 may comprise any food-grade, durable, but flexible material able to withstand repeated abrasion by dough-rolling curtains 122, 124. The sheeting conveyor 106 preferably comprises a perforated or chain-link structure of a durable material such as stainless steel, carbon steel, or another type of metal, a ceramic, or an abrasion-resistant polymer-based substance. The sheeting conveyor 106 is supported and conducted by several rollers. This conveyor 106 has a ramped section 108: an inclined launch section immediately followed by a more gradually declining (or leveling) discharge section. The grade of the launch section and the declining/discharge section, and thus the steepness of the ramp peak, will vary depending on the line speed. At typical production rates, however, the launch angle is preferably about 20 to about 24 degrees from level, and the decline angle is preferably about 4 to about 8 degrees from level.

The sheeting conveyor 106 is set in motion using a conveyor drive assembly 110, such as that shown in FIG. 2, which typically includes a motor (electric or gas) for the propelling force. A rolling unit 112 is positioned downstream from the sheeter 102 and above the sheeting conveyor 106. The rolling unit 112 preferably comprises several hanging mesh or chain curtains 122, 124 specifically selected for applying a desired amount of drag and weight onto the dough pre-forms 104. In a preferred embodiment, the sheeting conveyor 106 further comprises a laterally-supportive, stiff plate 114 and replaceable wear strips 116 positioned under the ramp area of the sheeting conveyor 106 to improve rolling reliability (by ensuring a flat rolling surface across the width of the conveyor) and increase conveyor belt life and ramp wear life. Several side guards 118 on either side of the sheeting conveyor 106 help protect operators from potential pinch points long the conveyor's length. If desired, a lift-arm assembly 120 can also be included for quick removal and/or replacement of the rolling curtains 122, 124.

In operation, after dough is sheeted and cut into pre-forms 104, the pre-forms 104 are conveyed over the ramp of the ramped section 108, which then gradually levels or drops off to induce the leading edge of each pre-form 104 to lift off of the conveyor 106 as each pre-form 104 crests over the ramp. A roll-initiating curtain (or "first hanging curtain") 122 catches the leading edge of each pre-form 104 as it passes under the curtain 122, thereby inducing each pre-form 104 to begin rolling back over itself. Thereafter, a roll-completing curtain (or "second hanging curtain") 124 completes the rolling of the dough pre-forms 104. In a preferred embodiment, the rolled product is a corn masa product and has: about 1.75 to about 2.25 wraps/rolls; a length of about 1.75 to about 2.25 inches; an outer diameter of about 0.32 to about 0.40 inches; and an inner diameter of about ¹⁄₁₆ths to about ³⁄₁₆ths of an inch. Most preferably, the rolled product after frying has: 2 wraps/rolls; a length of 1.9 inches; an outer diameter of 0.36 inch; and an inner diameter of about ⅛ths of an inch.

Figure 3:
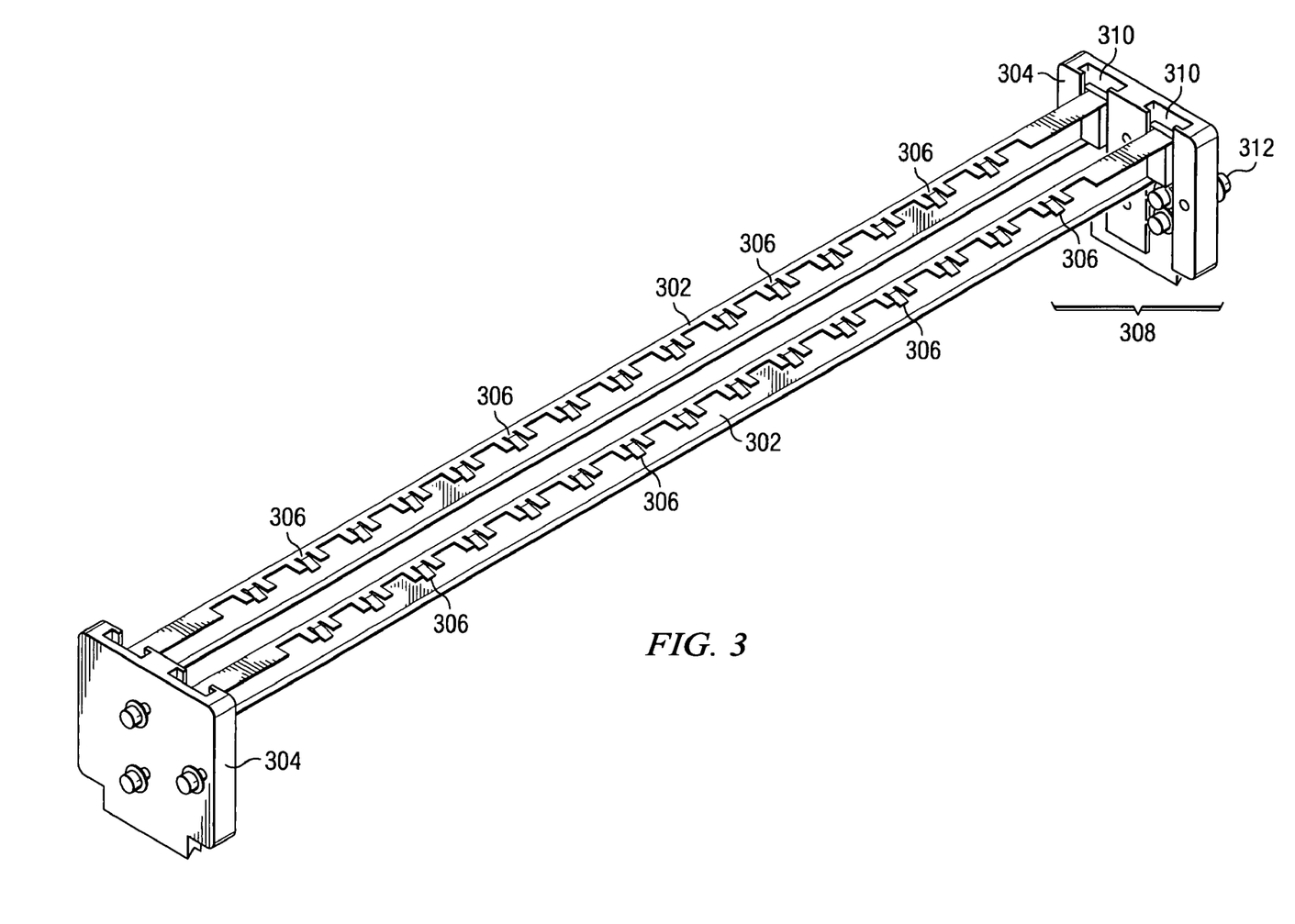
FIG. 3 is a perspective view of a rolling unit in accordance with a preferred embodiment of the present invention.

Rolling Unit—FIG. 3 is a perspective view of a rolling unit in accordance with a preferred embodiment of the present invention. The rolling unit's main function is to provide attachment points for the rolling curtains that cause dough pre-forms to be rolled. The rolling unit comprises at least one chain attachment bar 302 for each rolling curtain (or set of rolling curtains) and end adjustment plates 304 on either side of each chain attachment bar 302. Any sturdy fasteners or hooks can be used to attach the rolling curtains to the attachment bars 302. In a preferred embodiment, however, the rolling curtains are secured to the attachment bars 302 with three-pronged snap-type clips 306 that apply outward pressure against one or more rungs of the wire/chain mesh rolling curtains. The outward pressure helps retain the chain in place. In addition, the rolling curtains wrap around the upstream side of the chain attachment bars 302 from the clips 306 and then hang downward and downstream. Thus, gravity and downstream drag forces (during operation), as well as the pressure-fit design of the tabs/clips 306, keep the chain secured to the clips 306 atop the attachment bars 302.

Each chain attachment bar 302 is vertically adjustable and can be raised or lowered to achieve the most suitable position for the given circumstances—i.e. dough rheology, chain weight/pressure, chain angle of attack, and attachment bar clearance above the sheeter conveyor. In the embodiment shown in FIG. 3, the height-adjusting mechanism 308 for each chain attachment bar 302 comprises a vertical slotted guide 310 within the inner face of each end adjustment plate 304 and a bar-stop 312 that is moveably retained within the slotted guide 310. The bar-stop 312 has a vertical slit in the center portion through which the shafts of one or more securing screws can pass. Each securing screw fastens to the inner surface of its respective end adjustment plate 304, within the slotted guide 310. The bar-stop height is adjusted by moving the bar-stop 312 up or down within the slotted guide 310 and is then secured by tightening the securing screws. In operation, each attachment bar 302 is supported at its ends by the bar-stops 312 within the vertical slotted guides 310. Note, however, that other height-adjusting mechanisms are possible, and FIG. 3 merely depicts a preferred embodiment.

Figure 4:
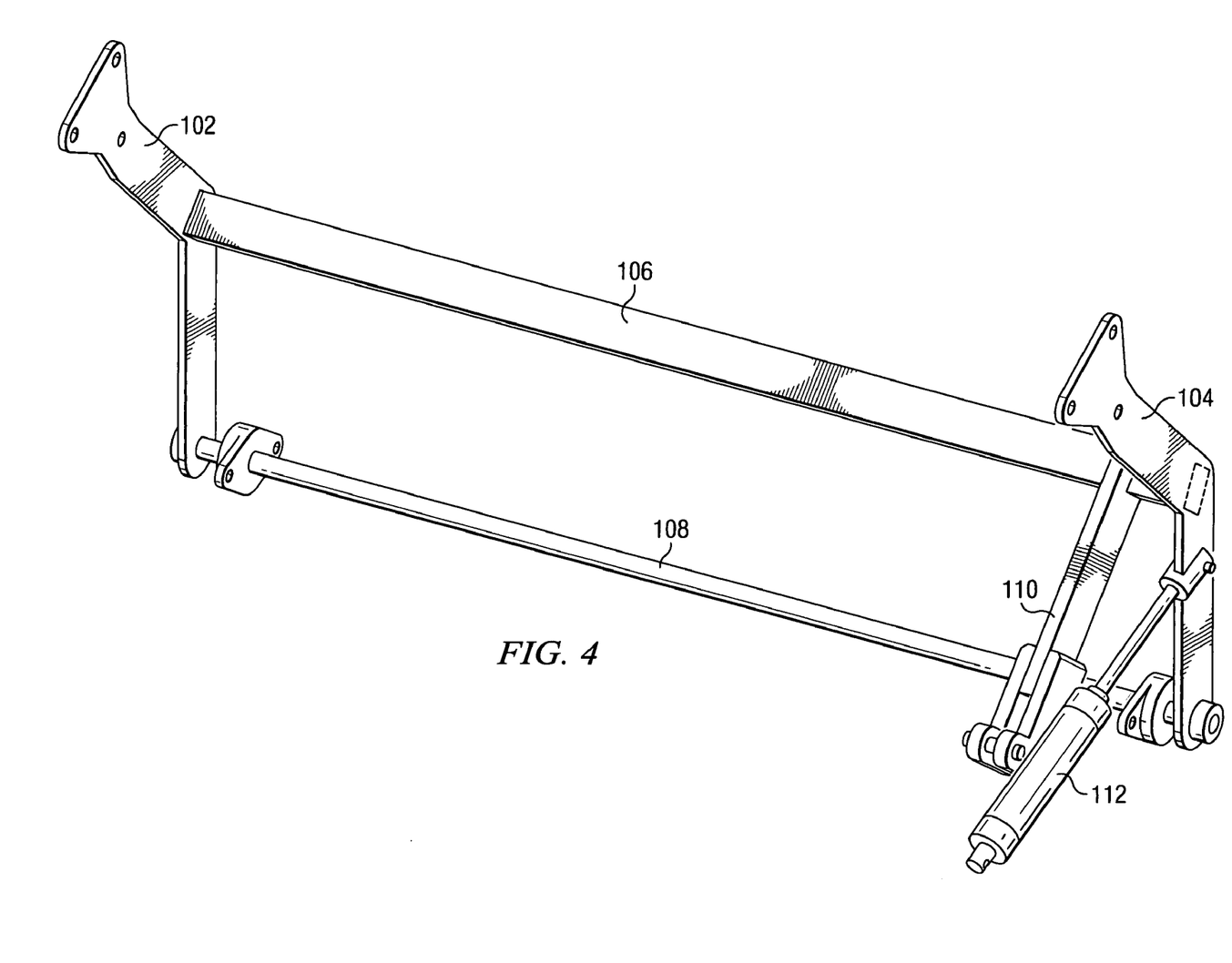
FIG. 4 is a perspective view of a lift-arm assembly in accordance with a preferred embodiment of the present invention.

Lift-Arm Assembly—FIG. 4 is a perspective view of a lift-arm assembly in accordance with a preferred embodiment of the present invention. The lift-arm assembly attaches to the rolling unit and permits the rolling unit to be raised quickly and locked into position for maintenance or when forming non-rolled products. In the embodiment shown in FIG. 4, the lift-arm assembly comprises a left lift-arm weldment 102 and right lift-arm weldment 104, which are connected by a lift-arm cross-brace 106 that spans the width of the sheeting conveyor. The lift-arm assembly pivots about a lift-arm shaft 108 that is positioned securely to, or adjacent to, the sheeting conveyor. In an alternative embodiment, the lift-arm assembly simply hinges about two separate pivot rods or bolts attached directly to the sides of the sheeting conveyor. If desired (although not necessary), a lift-arm safety lock 110 can be included to keep the lift-arm assembly locked in a raised position. The safety lock shown in FIG. 4 comprises a sturdy bar that hinges from a point that is away from the lift-arm's axis of rotation and under the lift-arm assembly. The safety lock bar 110 preferably has a notched end for receiving the lift-arm cross-brace 106. If desired, one or more pneumatic cylinders 112 can be used to actuate the lift-arm assembly, as shown in FIG. 4.

Figure 5:
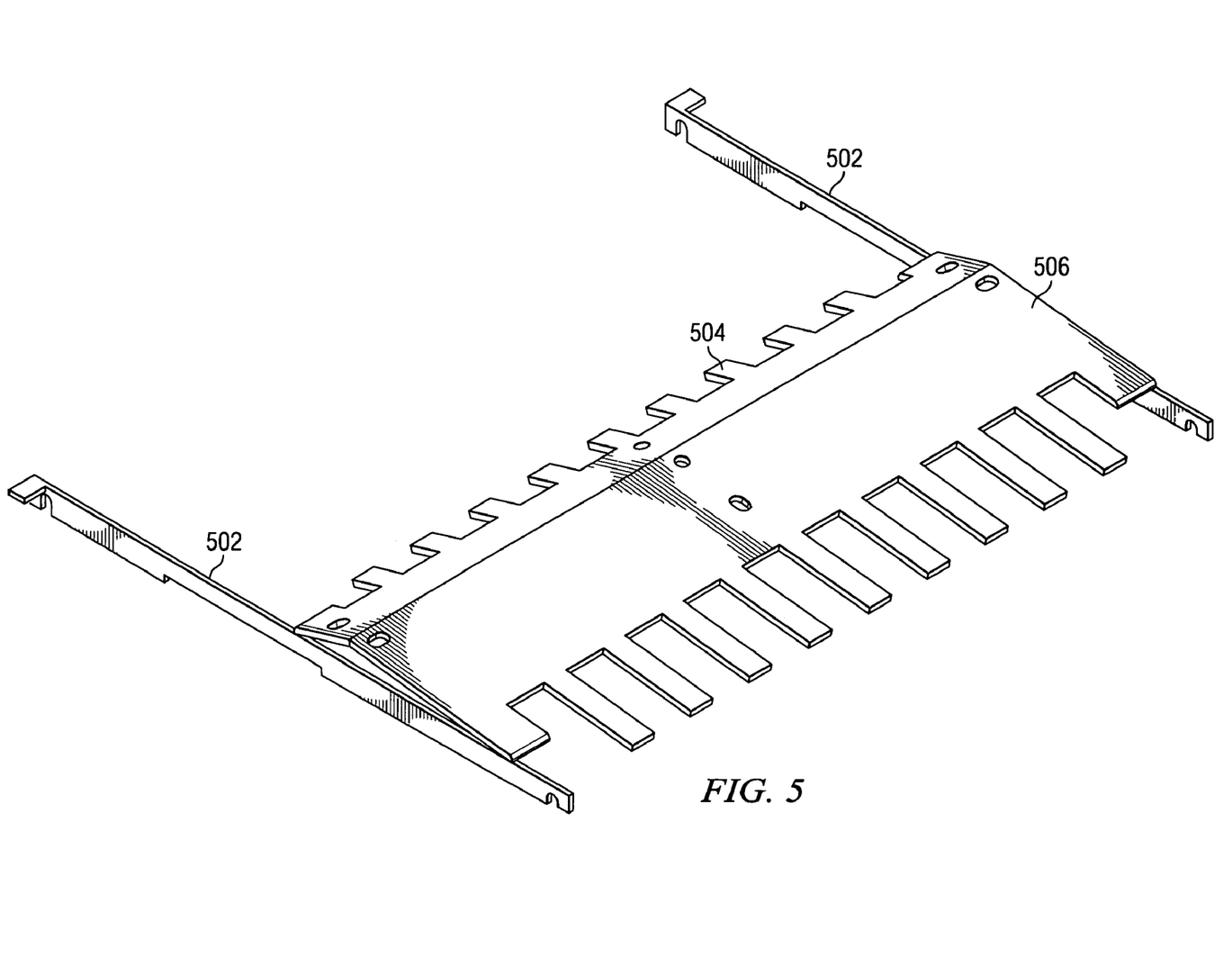
FIG. 5 is a perspective view of a conveyor ramp assembly in accordance with a preferred embodiment of the present invention.

Conveyor Ramp Assembly—FIG. 5 is a perspective view of a conveyor ramp assembly in accordance with a preferred embodiment of the present invention. The conveyor ramp comprises an ascending launch-side ramp wear plate 504 followed by a descending rolling-side ramp wear plate 506. Ramp weldments 502 on either side of the ramps 504, 506 are used to secure the conveyor ramp assembly to the sheeting conveyor. The launch-side ramp wear plate 504 is preferably steeper than the rolling-side ramp wear plate 506. The obtuse angle between the upper surfaces of the launch-side and rolling-side ramps should be large enough to ensure leading-edge separation from the sheeting conveyor, but the angle should not be excessively large, as an excessively steep ramp will be more prone to wear from the sheeter conveyor. Too large a ramp angle also causes full chip separation, which can significantly reduce the rolling reliability or even result in product jamming. If the ramp angle is too small, the leading edges of pre-forms may not properly separate from the conveyor, which results in decreased rolling completeness and reliability. The grade of the launch-side and the grade of the rolling-side sections, and thus the steepness of the ramp peak, will vary depending on the line speed. At typical production rates, however, the launch angle is preferably about 20 to about 24 degrees from level, and the rolling-side decline angle is preferably about 4 to about 8 degrees from level. The conveyor ramp assembly is installed beneath the sheeter conveyor belt such that when dough pre-forms are conveyed at adequate speed over the ramp, the leading edge of each pre-form lifts off of the sheeter conveyor before encountering the roll-initiating mesh curtain. If desired, replaceable wear plates and/or wear strips can be installed on the top surfaces of the launch-side and rolling-side ramps 504, 506 to prevent metal-to-metal contact and to provide a uniform surface for rolling. The wear plates/strips can be made of any material that is softer than the conveyor belts and wears without flaking or chipping, thus any type of stiff plastic or polymeric material can be used. For example, the wear plates/strips can be made of materials including but not limited to nylon and Teflon®. In a preferred embodiment, nylon is used. The sheeter conveyor path preferably levels after passing over the ramp assembly.

Also, a laterally-supportive, stiff wear plate can be placed below the sheeting belt to provide lateral support across the width of the conveyor, and thus a flat surface for rolling. This prevents the sheeting belt from sagging under its own weight. It is important to maintain a firm and flat surface across the width of the conveyor underneath the rolling chains, as sagging can prevent proper rolling of product, and energy that could have been used for rolling can be lost to non-productive work upon the conveyor. Note, however, that such a flat surface need not be level and is in fact at a slight decline in a preferred embodiment. Suitable materials for such a laterally-supportive, stiff wear plate are as described above with respect to the replaceable wear plates/strips.

Figure 6:
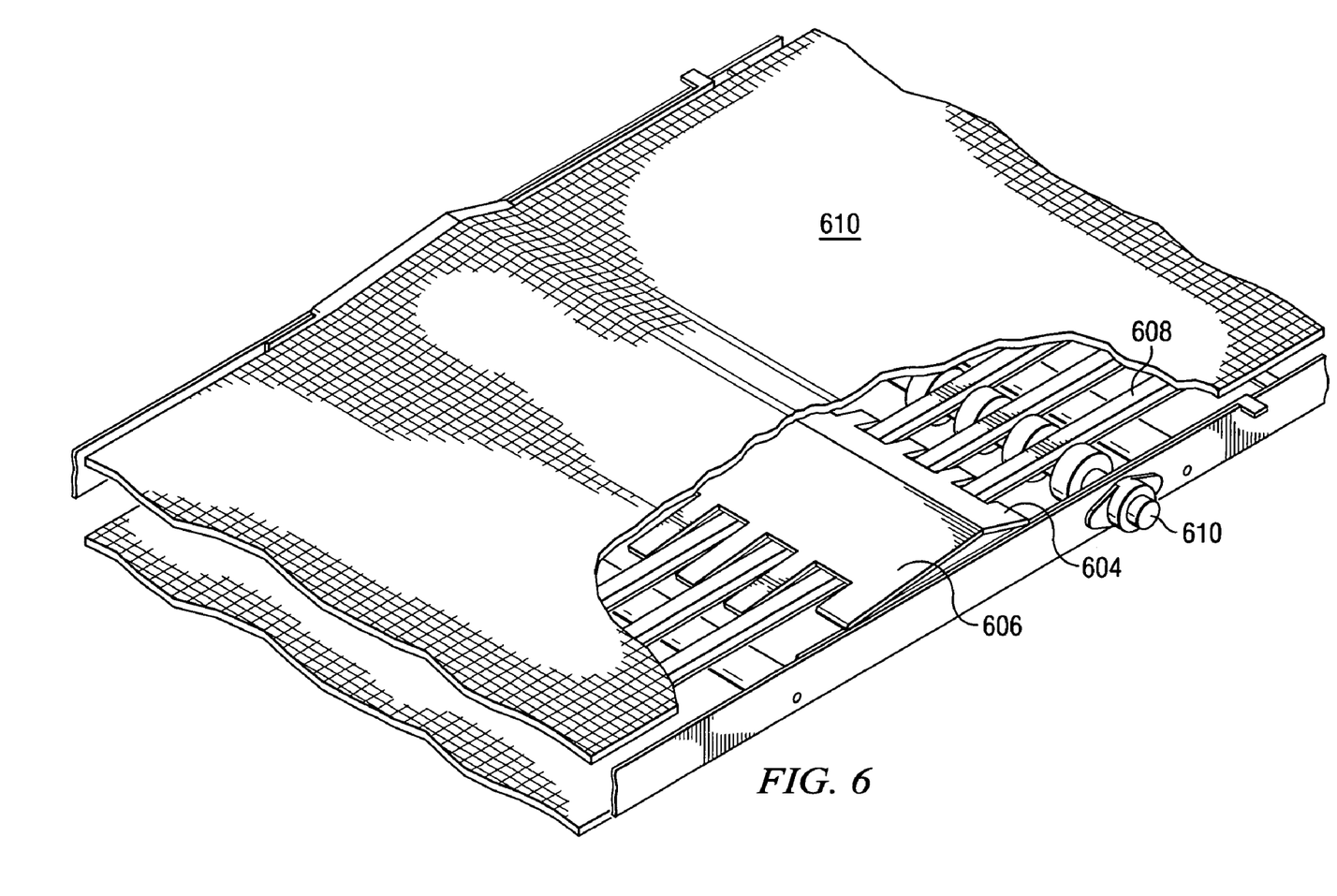
FIG. 6 is a perspective view of a conveyor ramp assembly in accordance with another embodiment of the present invention.

FIG. 6 is a perspective view of a conveyor ramp assembly in accordance with another embodiment of the present invention. In the particular embodiment shown in FIG. 6, several wear strips 608 are positioned under the belt of the sheeting conveyor 610. The wear strips are interspersed between the rollers of a magnetic drive roller. In addition, ramp wear plates are secured to the launch-side 604 and rolling-side 606 of a ramp assembly that is, in turn, secured to the sheeting conveyor by ramp weldments 602. Again, the materials that can be used for the wear strips 608 and wear plates are as described above.

Conveyor Drive Assembly—A conveyor drive assembly allows independent control of the sheeter conveyor speed. The sheeting conveyor requires more spacing between pre-forms than non-rolled products, because the nature of the rolling process causes the pre-forms to backtrack along the sheeting conveyor as the hanging curtains roll the pre-forms back over themselves. Thus, the sheeter conveyor belt speed should be greater than the sheeting/cutting speed in order to maintain adequate product spacing. The sheeter conveyor belt speed generally is between two-times to four-times as fast as the speed of the pre-forms exiting the sheeter/cutter, and it is preferably approximately three times as fast as the front roller of the sheeter/cutter. In one embodiment, the speed control is accomplished through a separate variable-speed motor and gear reducer combination. A timing belt drives the first idler roller of the conveyor which, in turn, drives a magnetic roller via a chain drive.

Guards—If desired (although not necessary), guard members can be positioned on the sides of the sheeting conveyor and hanging curtains to protect operators from potential pinch points. In addition, they can help prevent contact with the hazardous area between the chain attachment bars and the sheeting conveyor belt.

Figure 7:
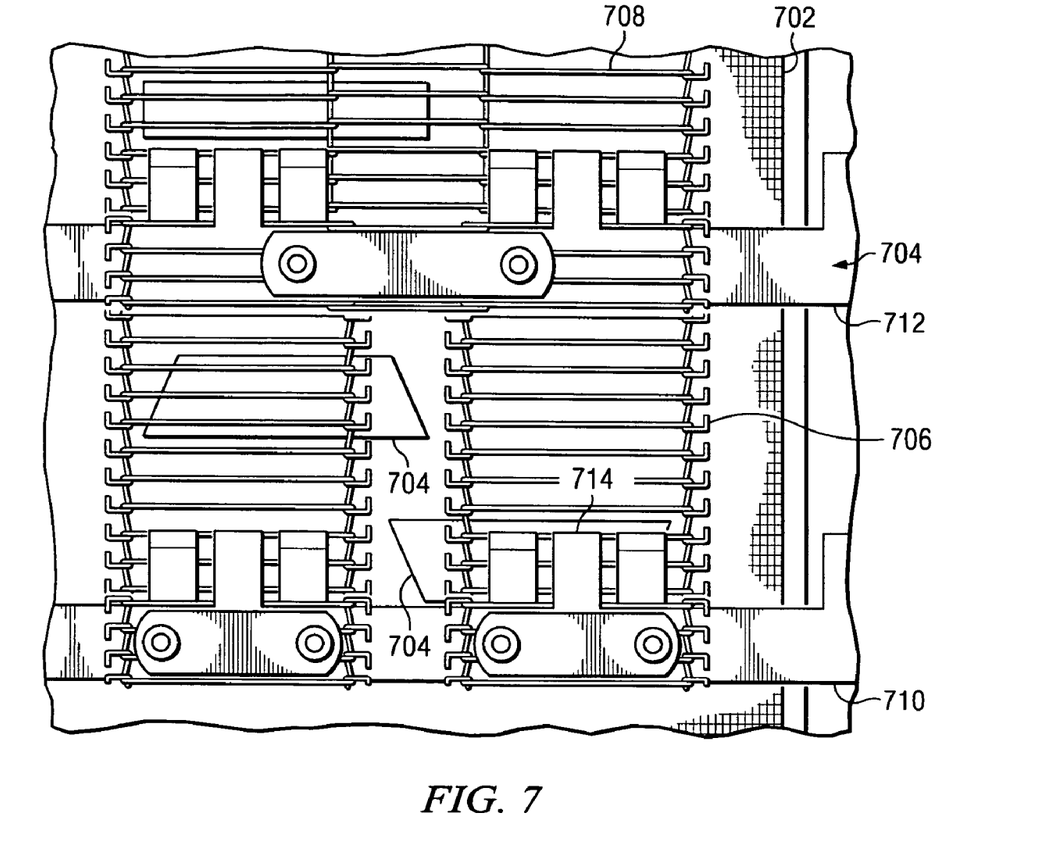
FIG. 7 is an overhead perspective view of a set of roll-initiating curtains and a set of roll-completing curtains attached to separate supporting bars in accordance with a preferred embodiment.

Dough-rolling Curtains—FIG. 7 is an overhead perspective view of a set of chain-mesh roll-initiating curtains 706 and a set of chain-mesh roll-completing curtains 708 attached to separate attachment bars 710, 712 with clips 714 in accordance with a preferred embodiment. The rolling curtains 706, 708 are held in position by their respective attachment bars 710, 712 over the sheeting conveyor 702, such that the curtains 706, 708 drag along the sheeting conveyor 702 during operation. FIG. 7 also shows several pre-forms 704 being rolled by the dough-rolling curtains 706, 708.

Proper chains for the product to be rolled should be identified before attaching to their associated attachment bar. While any chain-mesh-type material can be used for roll-initiating and roll-completing curtains, specific characteristics are desirable for each set of curtains. In a preferred embodiment, each attachment bar corresponds to a specific chain type, as their functions differ.

The first chain—the roll-initiating curtain 706, nearest the sheeter—is narrow and is preferably uncoated stainless steel. The chain links are preferably rectangular such that they catch the leading edges of the pre-forms as the leading edges lift off of the ramped portion of the conveyor. The chain links of the roll-initiating curtain 706, however, should be narrow enough so that entire pre-forms cannot pass through the links. Roll-initiating chains are preferably uncoated to maximize friction, and therefore their ability to catch the leading edges of pre-forms and cause the front edges to roll back upon the pre-forms. Furthermore, there is preferably an individual roll-initiating curtain 706 for every lane of pre-forms to ensure that each pre-form is properly initiated into a roll. Each roll-initiating curtain 706 should be just long enough to ensure that rolling is initiated, yet short enough for the curtain 706 to fall back into position and properly catch the leading edge of the next pre-form before it arrives.

The second chain—the roll-completing curtain 708, nearest the oven—is wider and preferably has an anti-sticking coating to help prevent dough build-up, which can undesirably increase the weight of the curtain. In a preferred embodiment, the roll-completing curtain 708 has a Teflon® coating. Other food-grade anti-sticking materials, however, can also be used. Like the first set of chains, the second set of chains preferably comprises rectangular links. Because the roll-completing curtain(s) 708 simply complete the rolling process, individual roll-completing curtains are not necessary for each lane of pre-forms. A single roll-completing curtain can span several lanes of pre-forms, if desired. The roll-completing curtains are generally longer than the roll-initiating curtains.

Each chain has an interference fit with the clips/tabs 714 of the attachment bars 710, 712 as shown in FIG. 7. A small amount of force is required to get the chains over the tab, but the chains should not require permanent bending to attach. Each chain 706, 708 wraps around the front side of its respective bar 710, 712 and then underneath to interface with the conveyor 702.

The proper chain material and attachment bar height will vary depending on the dough rheology and the desired characteristics of the rolled product to be made. For example, a more-tightly-rolled product generally requires a heavier-weight chain. Conversely, a less-tightly-rolled product generally requires a lighter-weight chain.

Also, the rolling unit must be properly aligned with the cutter. Failure to do so may result in unreliable rolling and unacceptable defect rates. The alignment can be checked by viewing pre-forms passing under the roll-initiating curtains from directly above. If the roll-initiating curtains tend to drift to one side, this is an indicator of misalignment. To align the chains, re-position the lift-arm assembly and rolling unit with respect to the product lanes upon the conveyor. Each of the curtains 706, 708 should be inspected periodically for damage (bent wires) and cleaned to remove dried masa or dough. If any damaged chains are discovered, they should be replaced. Preferably, side guards are in place before moving the lift arms or running the sheeter conveyor. The lift-arm assembly should be in the raised position before starting the sheeter. This prevents dough from building up on the drag chains.

Cutting Roller Die Patterns and Curtain Arrangement

Figure 8:
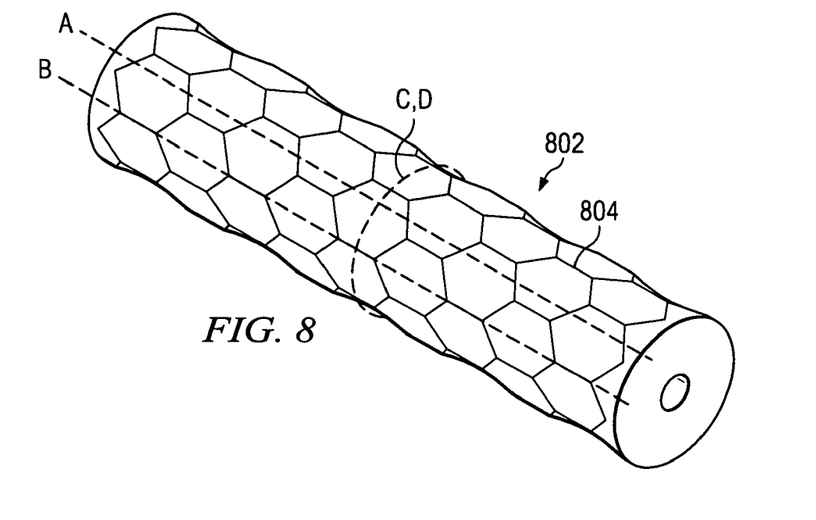
FIG. 8 is a partial perspective view of a cutting roller having cutting die patterns in accordance with one embodiment.

Many different shapes can be used for the cutting die patterns on the cutting roller such as the roller 802 shown in FIG. 8. The die patterns are preferably symmetrical about the longitudinal axis of the conveyor upon which pre-forms are deposited. Die pattern shapes can include circles, ovals, triangles (if oriented flat-side facing downstream), hexagons, squares, rectangles, trapezoids, and other polygons. The cutting roller patterns should preferably cut pre-forms that are oriented such that any narrow or pointed edges or sides do not face the rolling curtains. This reduces the risk of pre-forms partially or wholly passing through the chain links of the roll-initiating curtains, which can cause improper rolling or jamming.

The most common die shapes are circles and ovals. Certain polygon shapes, however, provide more efficient use of dough and space. For example, whereas oval and circular patterns leave a significant amount of wasted dough (often called "lace") between patterns, hexagonal patterns can be staggered to produce pre-forms with little or no dough/lace between the pre-forms. While various shapes enable efficient use of dough and space—including but not limited to squares, rectangles, trapezoids, and hexagons—hexagonal patterns are described herein for illustrative purposes.

In one embodiment, for example, the patterns are arranged into several lengthwise rolling lanes down the length of the sheeting conveyor, with each rolling lane containing two staggered, interlaced, lengthwise rows of hexagonal pre-forms. The hexagonal pre-forms initially emerge from the sheeter and cutter as staggered, interlaced, adjacent lengthwise rows of pre-forms, which are then spaced apart lengthwise by the more-quickly-rotating sheeting conveyor. Such a staggered, interlaced orientation of rows enables more lengthwise rows of pre-forms to be rolled along the same conveyor space than would otherwise be possible with traditional non-staggered, non-interlaced arrangements.

Each row of hexagonal pre-forms encounters its own roll-initiating curtain to ensure that each pre-form encounters a roll-initiating curtain unhindered by another pre-form's rolling. Because the rows in each lane are interlaced, the width of each roll-initiating curtain is preferably shorter than the overall width of each pre-form. Furthermore, the roll-initiating curtains must be positioned so that no curtain hangs above the interlaced area between two adjacent rows within a lane.

While a preferred embodiment has one roll-initiating curtain for each row of pre-forms, there need not be one roll-completing curtain for each row. Instead, a preferred embodiment has one roll-completing curtain spanning width of the two rows in each lane. If desired, each roll-completing curtain may alternatively span any number of rows: one row, three rows, four rows, and so on.

Note, however, that adjacent rows of pre-forms need not be staggered or interlaced, if such is not desirable. Likewise, pre-forms need not be arranged in lanes of two rows, if it is not desired.

FIG. 8 is a partial perspective view of a cutting roller 802 having cutting die patterns 804 in accordance with one embodiment. Although hexagonal die shapes are shown in FIGS. 8, 9, and 10, such shapes are merely exemplary, and other shapes are possible.

A common problem encountered in the prior art (and also encountered with the embodiment shown in FIG. 8) is that the overall cutting pressure required to cut sheeted dough into pieces may vary substantially throughout each revolution of the cutting roller. For example, in FIG. 8, the centerline of the cutting patterns C is parallel to the cutting roller's plane of rotation D (the plane containing the circular path of any given point on the cutting roller as it rotates). Thus, at certain cutting roller positions, several pattern edges are aligned at the nip (the area in contact with, or closest to, the opposing surface). For example, along the upper sight line/cutting line A, the cutting roller 802 need only apply enough pressure to cut through dough at a few points rather than along several entire edges of patterns. In contrast, along the lower sight line/ cutting line B, the cutting roller 802 must apply a much greater pressure to cut through dough along several aligned pattern edges. These bursts in minimum cutting pressures can cause mechanical stress and/or fatigue, as well as cause product defects due to uneven or incomplete cutting.

Figure 9:
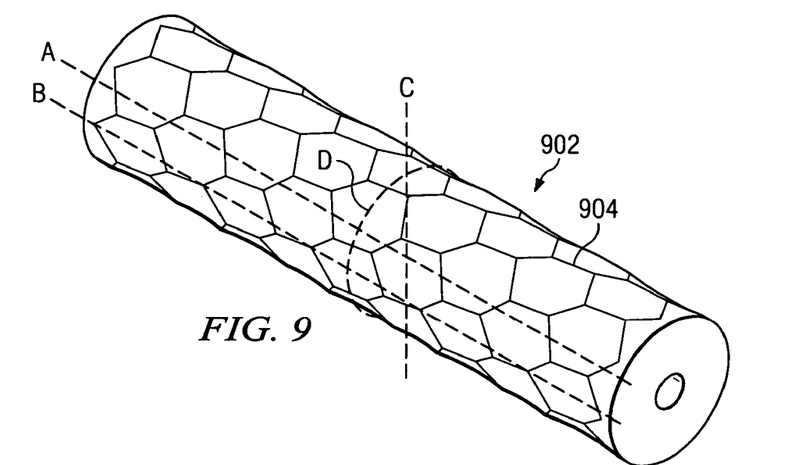
FIG. 9 is a partial perspective view of a cutting roller having cutting die patterns in accordance with one embodiment of the present invention.

FIG. 9 is a partial perspective view of a cutting roller 902 having cutting die patterns 904 in accordance with one embodiment of the present invention. Pre-form cutting patterns 904 on the sheeter/cutter 902 are slightly angled to make the required cutting pressures more uniform. By maintaining the centerline C of the cutting patterns 904 at an angle slightly different from that of the plane of rotation D, any linear cutting edges will be less likely to align at the nip. For instance, sample sight lines A and B in FIG. 9 show that no linear edges align at the nip.

Figure 10:
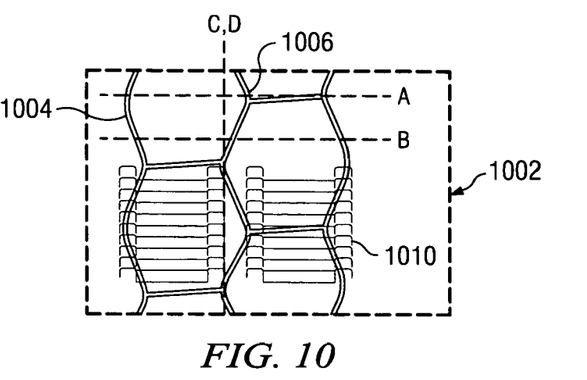
FIG. 10 is a partial perspective view of a cutting roller having cutting die patterns in accordance with another embodiment of the present invention, superimposed over segments of roll-initiating chains.

FIG. 10 is a partial perspective view of a portion of a cutting roller 1002 having cutting die patterns 1004 in accordance with another embodiment of the present invention, superimposed over segments of roll-initiating chains. Pre-form cutting patterns 1004 on the sheeter/cutter 1002 are slightly angled and staggered to make the required cutting pressures more uniform. As explained above, by maintaining the centerline of the cutting patterns 1004 at an angle slightly different from that of the plane of rotation, any linear cutting edges will be less likely to align at the nip. Again, sample sight lines A and B in FIG. 10 show that no linear edges align at the nip.

Unlike the patterns 904 shown in FIG. 9, which are simply rotated slightly, the patterns 1004 shown in FIG. 10 are skewed in addition to being rotated slightly. Consider, for example, the bottom left hexagonal pattern in FIG. 10: although the linear edges are at a slight angle and thus no longer parallel to any given nip line (which is parallel to sight lines A and B), the patterns are also skewed such that their centerline C remains parallel to the roller's plane of rotation D. This allows the pre-forms to exit the cutting stage in lanes that are parallel to the sheeting conveyor.

The pre-form cutting patterns shown in FIG. 10 also have rounded (or "radiused") edges to prevent sticking to the cutting roller, as sharp die patterns tend to cause sticking. Note, also, that the pre-form patterns are also slightly offset from the super-imposed segments of roll-initiating curtains/chains, representing the relative positioning of the pre-forms and the rolling curtains in operation. This ensures that at least some portion of the leading edge of each pre-form contacts the vertical link portion of the curtain, thus catching the pre-form while preventing it from sliding through the curtain.

While the invention has been particularly shown and described with reference to a preferred embodiment, it will be understood by those skilled in the art that various changes in form and detail may be made therein without departing from the spirit and scope of the invention.

We claim:

1. An apparatus for rolling sheeted dough, said apparatus comprising:
    a dough sheeter;
    a sheeting conveyor adjacent to the dough sheeter, wherein said sheeting conveyor has a ramped section, and further wherein said ramped section has an inclined portion and a declined portion;
    at least one roll-initiating curtain draped upon the sheeting conveyor over the ramped section; and
    at least one roll-completing curtain draped upon the sheeting conveyor downstream from the at least one roll-initiating curtain.

2. The apparatus for rolling sheeted dough of claim 1 wherein the top of said roll-initiating curtain is attached to a first chain attachment bar, the top of said roll-completing curtain is attached to a second chain attachment bar, and said first and second chain attachment bars are suspended above the sheeting conveyor by two pairs of vertically adjustable supports.

3. The apparatus for rolling sheeted dough of claim 2 wherein said two pairs of vertically adjustable supports are attached to a lift-arm assembly, and said lift-arm assembly is pivotally attached to the sheeting conveyor.

4. The apparatus for rolling sheeted dough of claim 1 wherein said sheeting conveyor comprises a belt support structure, an endless belt about said belt support structure, and a plurality of nylon wear strips between said belt support structure and said endless belt.

5. The apparatus for rolling sheeted dough of claim 1 wherein said at least one roll-completing curtain has an anti-sticking coating.

6. The apparatus for rolling sheeted dough of claim 1 wherein said dough sheeter has a plurality of cutting patterns, and further wherein each one of said plurality of cutting patterns has at least one straight side.

7. The apparatus for rolling sheeted dough of claim 6 wherein said cutting patterns have rounded vertices.

8. The apparatus for rolling sheeted dough of claim 6 wherein said cutting patterns are angled such that the at least one straight side of each cutting pattern is non-parallel to the axes of rotation of the dough sheeter.

9. The apparatus for rolling sheeted dough of claim 1 wherein said dough sheeter has a plurality of cutting patterns, and further wherein said cutting patterns are positioned and spaced to form, upon a sheeting conveyor, several longitudinal lanes of pre-forms, with each longitudinal lane containing two staggered, interlaced, longitudinal rows of pre-forms.

10. The apparatus of claim 9 wherein said cutting patterns have a hexagonal shape.

11. The apparatus of claim 9 wherein said cutting patterns have an oval shape.

12. The apparatus of claim 9 wherein said cutting patterns have a circular shape.

13. The apparatus of claim 9 wherein said cutting patterns have a trapezoidal shape.

14. The apparatus of claim 9 wherein said cutting patterns have a square shape.

15. The apparatus of claim 9 wherein said cutting patterns have a rectangular shape.

* * * * *